United States Patent
Yun et al.

(10) Patent No.: US 7,411,104 B2
(45) Date of Patent: Aug. 12, 2008

(54) METHOD FOR PRODUCING POLYBUTENE

(75) Inventors: Hyun-Ki Yun, Daejeon (KR);
Byeong-Gyu Lim, Daejeon (KR);
Myeong-Seog Kim, Daejeon (KR);
Se-Saeng Oh, Daejeon (KR); Jae-Hoon Uhm, Daejeon (KR)

(73) Assignee: Daelim Industrial Co., Ltd. (KR)

( * ) Notice: Subject to any disclaimer, the term of this patent is extended or adjusted under 35 U.S.C. 154(b) by 135 days.

(21) Appl. No.: 11/390,880

(22) Filed: Mar. 28, 2006

(65) Prior Publication Data

US 2006/0195000 A1  Aug. 31, 2006

Related U.S. Application Data

(63) Continuation-in-part of application No. 10/169,547, filed as application No. PCT/KR01/01901 on Nov. 9, 2001, now abandoned.

(30) Foreign Application Priority Data

Nov. 13, 2000  (KR) ................................. 2000-67057

(51) Int. Cl.
*C07C 2/02*  (2006.01)
*C08F 2/00*  (2006.01)
*C08F 4/00*  (2006.01)

(52) U.S. Cl. ........................ 585/525; 585/520; 526/209; 526/210; 526/212; 526/237; 526/348.7

(58) Field of Classification Search ................. 585/525, 585/520; 526/209, 210, 212, 237, 348.7
See application file for complete search history.

(56) References Cited

U.S. PATENT DOCUMENTS

| | | | | |
|---|---|---|---|---|
| 4,605,808 A | * | 8/1986 | Samson | 585/525 |
| 5,408,018 A | | 4/1995 | Rath | 526/237 |
| 5,688,887 A | | 11/1997 | Bagheri et al. | 526/348.7 |

FOREIGN PATENT DOCUMENTS

| | | |
|---|---|---|
| EP | 0 016 312 | 10/1980 |
| EP | 0 322 241 | 6/1989 |
| EP | 0 370 805 | 5/1990 |
| EP | 0 400 905 | 12/1990 |
| EP | 1026175 A1 * | 8/2000 |
| WO | WO 00/11040 | 3/2000 |

* cited by examiner

*Primary Examiner*—Glenn Caldarola
*Assistant Examiner*—In Suk Bullock
(74) *Attorney, Agent, or Firm*—St. Onge Steward Johnston & Reens LLC

(57) ABSTRACT

A method for producing high reactive polybutene (HRPB), in which carbon-carbon double bond is positioned at an end of polybutene, is disclosed. The high reactive polybutene having 300~5000 of number average molecular weight (Mn) can be produced from a raw material containing isobutene, wherein a polymerization reaction of the isobutene is carried out in the presence of a catalyst system including secondary alkylether, tertiary alcohol, and boron trifluoride, the amount of boron trifluoride is 0.05~1.0 weight part per 100 weight part of isobutene, the mole ratio of a co-catalyst including secondary alkylether and tertiary alcohol:boron trifluoride is 1.0~2.0:1, and the mole ratio of secondary alkylether:tertiary alcohol is 0.5~1.2:1.

6 Claims, No Drawings

METHOD FOR PRODUCING POLYBUTENE

CROSS-REFERENCE TO RELATED APPLICATIONS

This application is a continuation-in-part of U.S. patent application Ser. No. 10/169,547 filed Jul. 3, 2002 now abandoned, which is the National Stage of International patent application PCT/KR01/01901 filed on Nov. 9, 2001 which designated the United States and claimed priority from Korean patent application 2000/67057 filed on Nov. 13, 2000.

FIELD OF THE INVENTION

The present invention relates to a method for producing polybutene, and more particularly, to a method for producing high reactive polybutene (HRPB) in which carbon-carbon double bond is mostly positioned at the end of the polybutene.

BACKGROUND OF THE INVENTION

Polybutene is generally produced by polymerizing C4 olefin including isobutene in the presence of Friedel-Craft type catalyst, and has about 300~5000 of number average molecular weight (Mn). Remains after extracting 1,3-butadiene from C4 olefin is called as C4 raffinate-1, and the C4 raffinate-1 comprises paraffin such as iso-butane and normal-butane, and olefin such as 1-butene, 2-butene, and isobutene. The isobutene content in the C4 raffinate-1 is generally about 30~50 weight %. The C4 raffinate-1 is generally used for producing methyl-t-butylether (MTBE) which is useful as an octane number improver, or polybutene. The produced polybutene is mainly composed of isobutene units since the isobutene has the highest an octane number improver, or polybutene. The produced polybutene is mainly composed of isobutene units since the isobutene has the highest reactivity among the olefins in the C4 raffinate-1. Polybutene can also be produced from butane-butene oil (B—B oil) which is a C4 mixture derived from crude oil refining process. Alternatively, polybutene can be produced from pure isobutene.

The viscosity of polybutene increases as its molecular weight increases and the viscosity is about 4~40000 cSt (centi-stocks) at 100° C. Polybutene is pyrolyzed at the temperature of more than 275° C. without leaving residue, and has high solubility in lubricant or fuel because of its branched alkyl structure. For these reasons, polybutene is used as an anti-scuff agent or a viscosity index improver in engine oil, or used as detergent by being mixed with fuel of internal-combustion engine of a vehicle. In the past, the high reactive polybutene is not preferred since the same is mainly used for adhesive or insulating oil. However, the demand for high reactive polybutene constantly increases. This is due to the fact that the use of high reactive polybutene having a polar group as fuel detergent or lubricant additive gradually increases.

The most widely used polybutene formed by introducing a polar group is polyisobutenyl succinic anhydride (PIBSA) manufactured by reacting polybutene with maleic anhydride. Most of lubricant additive or fuel detergent is produced with PIBSA as an intermediate. In case that the double bond of polybutene is positioned at its end, PIBSA can be obtained in high yield. However, when the double bond is positioned in the interior of the polybutene and the number of alkyl group substituted to the double bond increases, reactivity of polybutene is lowered, which decreases the PIBSA yield. For increasing the reactivity of polybutene, a method of chlorinating polybutene with chlorine gas and then, reacting the chlorine product with maleic anhydride is known. However, this method is not preferable in an economic and/or an environmental aspect since it costs much due to the expensive equipment for preventing corrosion of a reactor, and a large quantity of basic solution should be used to neutralize the un-reacted chlorine gas. In addition, when PIBSA containing a large amount of chlorine is used for fuel additives, it may cause a corrosion of engine. Accordingly, researches for increasing the reactivity of polybutene by changing its polymerization condition are constantly in progress. Types of double bond that effect the reactivity of polybutene depend on the number of alkyl group substituted to the double bond as shown in equation 1.

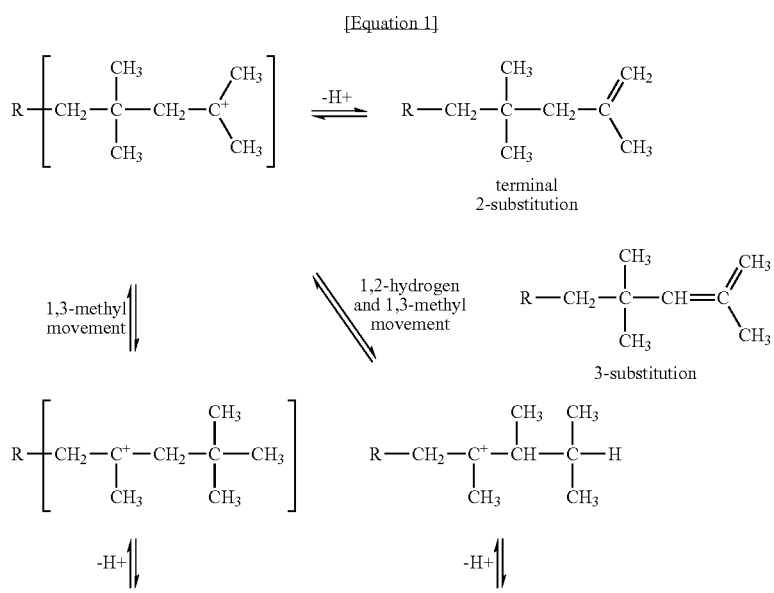

[Equation 1]

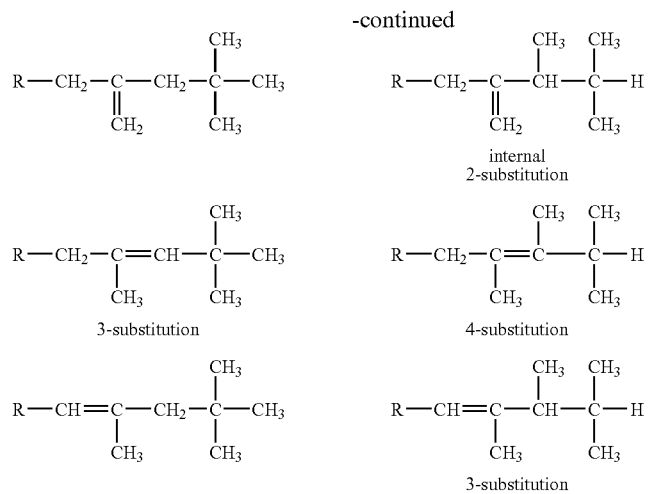

internal
2-substitution 3-substitution 4-substitution 3-substitution

As Friedel-Craft type catalyst for producing polybutene, aluminum trichloride or boron trifluoride are generally used. The high reactive polybutene that contains relatively large amount of terminal double bond is obtained when boron trifluoride is used. For example, it is reported in Journal of Polymer Science, Symposium no. 56, 191-202(1976), that content of terminal double bond increases up to 40% for 5~7 minutes of contact time when boron trifluoride or complex compound of boron trifluoride are used with co-catalyst such as acetic acid or water. According to this method, polybutene which contains high content of terminal double bond can be obtained, while the content of terminal double bond is 5~20% when conventional aluminum trichloride is used. However, there is also disclosed that as the contact time is longer, the position of the vinylidene (terminal double bond) of the produced polymer moves to the internal position of the polymer, and therefore, the reactivity of polybutene decreases. This is indirectly shown in Khim I Teknol, Topliv 1 masel, vol. 10, pp 23-26, written by Mullin M. A. According to this literature, methanol or mixture of methanol/ethanol and complex compound of $BF_3$ are used, and the contact time is 30~40 seconds. This means that the catalyst should be very carefully used in the polymerization. The fact that the contact time should be maintained to be short when boron trifluoride catalyst is used for the isobutene polymerization is also emphasized in European Patent No. 016312 A1. There is disclosed that the contact time and the concentration of catalyst should be strictly controlled, and especially, the contact time should be maintained within 40 seconds to prevent the double bond isomerization.

European Patent No. 400,905 A1 discloses that when boron trifluoride-ethanol complex is used, the contact time can be prolonged to more than 1 minutes, possibly 8~70 minutes, and more preferably 12~20 minutes without inducing the isomerization of double bond in the product, and therefore, reaction variables can be effectively controlled. European Patent No. 400,905 A1 is regarded as an advanced one because the product can maintain the content of terminal vinylidene of more than 70% while maintaining the contact time of more than 8 minutes.

U.S. Pat. No. 5,688,887 discloses a method for producing polybutene having more than 80% of terminal vinylidene content by using boron trifluoride-ether complex catalyst, wherein the ether have at least one tertiary alkyl group. In this method, less isomerization is induced even though the contact time is prolonged. The reason of the less isomerization under the prolonged contact time is that the catalyst does not induce an initiation reaction of the isomerization. That is, the catalyst does not produce proton, and thus prevents that proton decreases the content of the terminal vinylidene by isomerization. According to the examples of the above-mentioned patent, the most desirable result is obtained when ether having both a secondary alkyl group and a tertiary alkyl group (for example, isopropyl t-butylether) is used. However, the above-mentioned ether compound is not a commercialized material. Therefore, to use the material as the co-catalyst (initiator), an additional equipment to produce the compound is required. For this reason, the above-mentioned method is not commercially implemented.

U.S. Pat. No. 5,408,018 discloses a method for producing polybutene containing more than 80% of terminal vinylidene content and having a narrow molecular weight distribution by using secondary alcohol-boron trifluoride complex as a catalyst system. However, this method has disadvantages in that the reaction condition, for example, reaction temperature, is difficult to control since the reaction temperature is relatively low, and the contact time should be controlled within 9 minutes.

SUMMARY OF THE INVENTION

It is an object of the present invention to provide a method of producing high reactive polybutene having more than 80% of content of terminal double bond.

It is other object of the present invention to provide a method of producing high reactive polybutene in which the content of terminal double bond less changes even though the contact time is prolonged.

It is another object of the present invention to provide a new catalyst system for producing high reactive polybutene which is easy to obtain and inexpensive.

To achieve these objects, the present invention provides a method of producing high reactive polybutene having 300~5000 of number average molecular weight (Mn) from (a) isobutene, (b) C4 hydrocarbon compounds derived from cracking of naphtha, and containing more than 10 weight % of isobutene, or (c) C4 hydrocarbon compounds derived from a refining process of crude oil or from catalytic cracking of heavy gas oil, and containing more than 10 weight % of isobutene, wherein a polymerization reaction of the isobutene is carried out in the presence of a catalyst system comprising secondary alkylether, tertiary alcohol, and boron trifluoride, the amount of boron trifluoride is 0.05~1.0 weight part per 100 weight part of isobutene, the mole ratio of a co-catalyst including secondary alkylether and tertiary alcohol:boron trifluoride is 1.0~2.0:1, and the mole ratio of secondary alkylether:tertiary alcohol is 0.5~1.2:1.

DETAILED DESCRIPTION OF THE INVENTION

Hereinafter, the detailed description of the present invention is provided. The present invention is characterized in that a catalyst system including secondary alkylether, tertiary alcohol, and boron trifluoride is used to produce polybutene in which the content of terminal double bond to entire double bond is more than 80%. In conventional methods of producing polybutene, tertiary alcohol is not used as a co-catalyst. This is due to the fact that tertiary alcohol decreases the content of terminal vinylidene, compared with secondary or primary. However, the inventors of the present invention discovered that when tertiary alcohol is used with secondary alkylether, the content of terminal double bond of polybutene increases and is not influenced seriously by the contact time.

Secondary alkylether useful in the present invention is symmetrical or asymmetrical secondary alkyl ether having alkyl group of carbon number of 3~20, preferably, is selected from the group consisting of diisopropylether, di(sec-butyl)ether, di(sec-hexyl)ether, di(sec-octyl)ether and mixtures thereof, and more preferably is diisopropylether. For example, polybutene which has high content of terminal vinylidene and is not influenced much by the contact time during polymerization reaction can be produced with the catalyst system of the present invention. For example, the catalyst system can be obtained as follows. First, boron trifluoride is added to diisopropylether to form a solid complex and then, tertiary alcohol, such as t-butylalcohol (TBA), is added to the solid complex to form a liquid catalyst system. Tertiary alcohol useful for the present invention is tertiary alcohol having carbon number of 4~20, preferably, is selected from the group consisting of t-butylalcohol, diacetonalcohol (4-hydroxy-4-methyl-2-pentanone), 2-methyl-2-butanol and mixtures thereof, and more preferably, is t-butylalcohol or 2-methyl-2-butanol. Diisopropylether as secondary alkylether and t-butylalcohol as tertiary alcohol are easy to purchase, therefore additional equipment for producing diisopropylether or t-butylalcohol is not required.

To produce the catalyst system by reacting secondary alkylether, tertiary alcohol, and boron trifluoride, it is preferable to add boron trifluoride to secondary alkylether or the mixed solution of secondary alkylether and tertiary alcohol. If boron trifluoride is added to tertiary alcohol without secondary alkylether, the catalyst system may become a black material and polybutene having low content of terminal vinylidene can be obtained with the catalyst system. When boron trifluoride is added to secondary alkylether, for example, diisopropylether, solid material is formed by the reaction of boron trifluoride and secondary alkylether. Then, tertiary alcohol, for example, t-butylalcohol is added to dissolve the solid material, so that the dissolved material is used as the catalyst system. Considering efficiency of catalyst system manufacturing process, it is preferable to add boron trifluoride to the mixture of secondary alkylether and tertiary alcohol. It is experimentally confirmed that the properties of catalyst are not influenced in this case.

Since the reaction for forming a complex of boron trifluoride and co-catalyst is an exothermic reaction, it is preferable to remove heat during the reaction for preventing the decomposition or an explosion of the catalyst system. Accordingly, it is preferable that the catalyst system manufacturing reaction is performed at a temperature of less than 40° C., preferably less than 20° C., and more preferably −40° C.~0° C. at which the stability of catalyst system can be maintained because the heat of reaction is satisfactorily removed.

The amount of $BF_3$ is preferably 0.05~1.0 weight parts per 100 weight part of isobutene in the raw material (hydrocarbon compounds). Generally, polybutene produced according to the present invention has 300~5000 of number average molecular weight (Mn). When the amount of $BF_3$ is more than 1.0 weight part, the polymerization process becomes non-economical, and the catalyst should be removed from the product by an additional process. When the amount of $BF_3$ is less than 0.05 weight part, there is problem that the yield of polybutene becomes lower.

It is preferable that the mole ratio of secondary alkylether/tertiary alcohol is 0.5~1.2. It is more preferable that the amount of tertiary alcohol does not exceed the amount of secondary alkylether, that is, the more preferable mole ratio of secondary alkylether/tertiary alcohol is 1.0~1.2. If the mole ratio of secondary alkylether and tertiary alcohol is less or more than the above-mentioned range, the content of the terminal vinylidene decreases, and the advantageous effect of the present invention cannot be achieved. The mole ratio of co-catalyst including secondary alkylether and tertiary alcohol to boron trifluoride is preferably 1.0~2.0:1, and more preferably 1.2~1.8:1. When the mole ratio of co-catalyst/boron trifluoride is more than 2.0, the activity of catalyst and the yield of polybutene decrease. When the mole ratio thereof is less than 1.0, the content of terminal vinylidene decreases.

When necessary, polar solvent may additionally be used to disperse the catalyst system in the raw material. If the polar solvent is used, the catalytic activity increases due to the regular dispersion of the catalyst system, and thereby the content of terminal vinylidene increases. As the polar solvent, at least one compound selected from the group consisting of chloromethane, dichloromethane, and chloroform can be used, and it is preferable to use more than 50 weight part of the polar solvent per 100 weight part of the catalyst(boron trifluoride) and the co-catalyst. However, the polar solvent is a chloride compound, and has a disadvantage of producing corrosive substances during the high temperature polymerization reaction. The corrosive substances may induce the corrosion of the reactor, and can also be incorporated into the final product, which deteriorates the properties of the final product. Therefore, it is more preferable that the catalyst system of the present invention is prepared by adjusting the mole ratios of the components thereof without using the polar solvent.

The catalyst system can be added to the polymerization reaction in various ways. For example, the catalyst system of the present invention can be separately formed, and then the obtained liquid catalyst system can be added into a polymerization reactor. Alternatively, the raw material (hydrocarbon) of polybutene, the co-catalyst, and the catalyst can be introduced into the reactor at the same time through separate supply lines. Further alternatively, the co-catalyst and the raw material of polybutene are mixed, and the mixed material can be introduced into the reactor, and then gaseous boron trifluoride is supplied into the reactor through another supply line. In all cases, the amount of catalyst($BF_3$), the mole ratio of the catalyst and the co-catalyst, and the mole ratio of the co-catalysts should be maintained as described above.

In U.S. Pat. No. 5,191,044, it is disclosed that polybutene having high content of terminal vinylidene can be produced when free $BF_3$ is removed from the polymerization reactor by using vacuum or passing inert gas through the reactor. However, in the present invention, the free $BF_3$ does not influence much on the terminal vinylidene content. Thus, the additional $BF_3$ removing process is not necessary in the present invention, and therefore the catalyst system of the present invention is superior to the conventional catalyst system in economical aspect.

Examples of raw material for producing polybutene of the present invention includes (a) isobutene, (b) C4 hydrocarbon compounds (for example C4 raffinate) derived from cracking of naphtha, and containing more than 10 weight % of isobutene, and (c) C4 hydrocarbon compounds (for example, B—B oil) derived from a refining process of crude oil or from catalytic cracking of heavy gas oil, and containing more than 10 weight % of isobutene.

If isobutene, especially pure isobutene or isobutene diluted with a saturated hydrocarbon is used, there is a disadvantage that the price of the raw material increase, but the un-reacted raw material can be recovered from the reactor and re-used. In the cation polymerization reaction, if the reaction temperature and the conversion ratio of the raw material into resin decrease, the molecular weight of the produced polymer increases. If it is difficult to decrease the reaction temperature, the resin conversion ratio can be decreased to increase the molecular weight. However, if the raw material is not pure, the composition of the raw material changes continuously when the same is re-used. Thus, it is difficult to produce polybutene having a uniform quality.

Since B—B oil or C4 raffinate includes normal butene such as 1-butene and 2-butene as well as isobutene and is inexpensive in comparison with that of a pure isobutene, B—B oil or C4 raffinate is more preferable as the raw material for producing polybutene. The normal butene has a low reactivity compared with isobutene, but can be included in the produced polybutene. When the reaction temperature increases, the more normal butene participates in the polymerization reaction. Then the viscosity of polybutene increases, and thermal stability thereof decreases compared with those of polybutene not including the normal butene. Accordingly, when raw material including normal butene is used, it is necessary to maintain the temperature of polymerization reaction properly. Generally, the preferable reaction temperature is −50° C.~20° C., more preferably −40° C.~−10° C., and most preferably, −30° C.~−0° C. When the reaction temperature is more than 20° C., the participation ratio of normal butene increases though the conversion ratio is maintained low. When the reaction temperature is less than −50° C., the reactivity is excessively lowered, which results in the lower productivity and the excessively high molecular weight. In this case, it is difficult to use the produced polybutene as fuel detergent or lubricant additive.

The reaction pressure should be controlled for the raw material to be maintained in a liquid state at the reaction temperature, and the preferable reaction pressure is more than 3 kg/cm². The contact time, which is the time for which the raw material is in the polymerization condition in a continuous polymerization reaction, is closely related with the conversion ratio. The contact time should be controlled in consideration of an aspect of economical use of the raw material and the participation ratio of the normal butene. The conversion ratio of isobutene to polybutene is preferably more than 50%, more preferably 70~99%, and most preferably 80~95%. When the catalyst system of the present invention is used, the contact time required to obtain such a conversion ratio is approximately 5~180 minutes though the contact time can be varied according to the reaction temperature and the amount of the catalyst system. When the reaction temperature is lowered, the reaction speed becomes slow; accordingly, it is necessary to increase the contact time to obtain the desired conversion ratio.

Preferred examples of the present invention and comparative examples are provided hereinafter. However, the present invention is not limited to the following examples.

EXAMPLE 1

3.63 g(54 mmol) of gaseous boron trifluoride was introduced into 100 ml reactor in which 7.65 g(75 mmol) of diisopropylether (IPE) was contained while cooling the reactor to −5° C. and stirring the reactor. 5.4 g(72.9 mmol) of t-butylalcohol was added to the produced white crystal, and stirred for 5 minutes to completely dissolve the white crystal. By passing nitrogen gas through the reactor for 5 minutes, the final catalyst was obtained. The obtained catalyst system and the raw material (C4 raffinate-1) having the composition shown in Table 1 were continuously introduced into a pressure reactor, which was maintained to −6° C. by a cooler. The pressure of the reactor was maintained to more than 3 kg/cm² so that the raw material was in a liquid state. Average contact time was maintained to 45 minutes, and the catalyst system was introduced so that 0.2 weight part of $BF_3$ was introduced per 100 weight part of isobutene in the raw material.

TABLE 1

| Component | Isobutane | n-butane | 1-butene | Cis-2-butene | Trans-2-butene | Isobutene |
|---|---|---|---|---|---|---|
| Content (weight %) | 2.09 | 6.79 | 29.71 | 4.41 | 9.50 | 47.50 |

After 180 minutes, the polymerization reaction was stopped by directly introducing the polymerization product from the outlet of the reactor into a receptacle in which excess methanol was contained. Thereafter, hexane, the volume of which was 3 times of the polymerization product, was added to the polymerization product for removing methanol from the polymerization product. Finally, oligomer was removed by stripping the polymerization product for 30 minutes at the conditions of 220° C. and 5 mmHg. The molecular weight of the obtained polybutene was measured with GPC(Gel Permeation Chromatography) and the content of terminal vinylidene was analyzed by C13-NMR. As a result, the conversion ratio of isobutene was 99%, the molecular weight (Mn) was 1030, the polydispersity(Pd) was 1.52, and the content of terminal vinylidene was 86%.

EXAMPLE 2

17.68 g(261 mmol) of gaseous boron trifluoride was introduced into 100 ml reactor in which 19.13 g(188 mmol) of diisopropylether and 13.12 g(177 mmol) of t-butylalcohol were contained while cooling the reactor to −5° C. and stirring the reactants to obtain the catalyst. Except of using the produced catalyst system and that the polymerization temperature and the contact time were controlled as shown in Table 2, polybutene was produced in the same manner of Example 1. The catalyst system was used after removing free $BF_3$ by passing nitrogen gas through the catalyst system for 5 minutes except the one marked "Free $BF_3$ not removed" in Table 2.

TABLE 2

| Reaction temperature (°C.) | Contact time (minute) | Conversion ratio (%) | Molecular weight Mn (polydispersity) | Terminal Vinylidene Content (%) |
|---|---|---|---|---|
| −4 (Free BF₃ not removed) | 45 | 99 | 180 (1.30) | 82 |
| −4 | 45 | 98 | 830 (1.36) | 83 |
| −6 | 45 | 95 | 920 (1.45) | 85 |
| −8 | 15 | 82 | 1400 (1.80) | 87 |
| −9 | 45 | 87 | 1420 (1.90) | 89 |
| −12 | 45 | 75 | 1750 (2.05) | 92 |
| −12 | 90 | 90 | 1680 (1.95) | 90 |

EXAMPLE 3

The catalyst system of Example 2 was used after removing the free BF₃, and the raw material including 65 weight % of isobutene and 35 weight % of isobutane was used. The polymerization was carried out at −12° C. of the reaction temperature and for 45 minutes of the contact time. After-treatment was performed for the produced polybutene in the same manner of Example 1. The properties of produced polybutene were analyzed. As a result, the molecular weight (Mn) of the produced polybutene was 1850, the polydispersity (Pd) was 1.85, the content of terminal vinylidene was 93%, and the conversion ratio of isobutene was 82%.

EXAMPLE 4

2.62 g (25.6 mmol) of diisopropylether and 1.90 g (25.6 mmol) of t-butylalcohol were mixed with 4000 ml of C4 raffinate-1 having the composition shown in Table 1. The mixture was introduced into a 330 ml reactor at −16° C. and at a speed of 4.03 g/minute, and gaseous boron trifluoride was introduced thereto at a speed of 1.5 ml/minute simultaneously. Average contact time was 45 minutes, and the reaction reaches to a steady state 360 minutes after. The molecular weight (Mn) of the produced polybutene was 1970, the polydispersity (Pd) was 2.15, the content of terminal vinylidene was 87%, and the conversion ratio of isobutene was 90%.

EXAMPLE 5

The catalyst system was produced according to the method of Example 1 except that 20 g of dichloromethane and 1.1 g (15 mmol) of t-butylalcohol were used instead of 5.4 g of t-butylalcohol. Polymerization reaction was carried out in the same manner of Example 1 with the produced catalyst system. As a result, the conversion ratio of isobutene was 99%, the molecular weight (Mn) of the produced polybutene was 1040, the polydispersity (Pd) was 1.50, and the content of terminal vinylidene was 84%.

EXAMPLES 6~9

The catalyst systems were produced with boron trifluoride, isopropyl ether and t-t-butylalcohol of the compositions shown in Table 3 according to the method of Example 2. Except of using the produced catalyst systems and that the polymerization temperature and the contact time were controlled to −10° C. and 45 minutes, respectively, polybutene was produced in the same manner of Example 1. The properties of the produced polybutene were measured, and the results are set forth in Table 3.

TABLE 3

| No. | Boron Trifluoride | diisopropylether | t-butyl alcohol | Ether/ alcohol ratio | Cocat./ BF₃ ratio | Conversion ratio | Terminal vinylidene Content |
|---|---|---|---|---|---|---|---|
| Example 6 | 12.4 g (183 mmol) | 13.1 g (128 mmol) | 9.5 g (128 mmol) | 1.0 | 1.4 | 83% | 89% |
| Example 7 | 12.4 g (183 mmol) | 11.8 g (115 mmol) | 10.4 g (140 mmol) | 0.82 | 1.4 | 85% | 87% |
| Example 8 | 12.4 g (183 mmol) | 10.5 (102 mmol) | 11.4 g (154 mmol) | 0.67 | 1.4 | 86% | 86% |
| Example 9 | 15.1 (223 mmol) | 13.7 (134 mmol) | 9.9 (134 mmol) | 1.0 | 1.2 | 93% | 83% |

(In Table 3, "Cocat" is diisopropylether and t-butyl alcohol.)

COMPARATIVE EXAMPLE 1

The catalyst system was produced according to the method of Example 1 except that 20 g of dichloromethane was used instead of 5.4 g of t-butylalcohol. Polymerization reaction was carried out in the same manner of Example 1 with the produced catalyst. As a result, the conversion ratio of isobutene was 99%, the molecular weight (Mn) of the produced polybutene was 1050, the polydispersity(Pd) was 1.55, and the content of terminal vinylidene was 81%.

COMPARATIVE EXAMPLE 2

The catalyst system was produced by adding 16.0 g (236 mmol) of boron trifluoride to 22.32 g (371 mmol) of isopropylalcohol (IPA) at −5° C., and then nitrogen gas was passed through the catalyst for 5 minutes. The raw material of Table 1 was used, and the continuous polymerization was carried out with 0.1 weight % of the catalyst at −8° C. for 15 minutes of contact time to obtain polybutene. As a result, the conversion ratio of isobutene was 86%, the molecular weight (Mn) of the produced polybutene was 1450, the polydispersity(Pd) was 1.75, and the content of terminal vinylidene was 81%. In case that the contact time was controlled to 30 minutes, the conversion ratio of isobutene was 98%, the molecular weight (Mn) of the produced polybutene was 1350, the polydispersity was 1.70, and the content of terminal vinylidene was 73%.

COMPARATIVE EXAMPLE 3

The catalyst system was obtained by cooling 17.82 g (202 mmol) of methyl-t-butylether, adding 9.79 g (144 mmol) of boron trifluoride at −5° C., and passing nitrogen gas through the catalyst for 5 minutes. The continuous polymerization was carried out at −8° C. of the reaction temperature, 15 minutes of the contact time, and 0.2 weight % of the catalyst system to produce polybutene. As a result, the conversion ratio of isobutene was 84%, the molecular weight (Mn) of the produced polybutene was 1300, the polydispersity (Pd) was 1.82, and the content of terminal vinylidene was 83%.

COMPARATIVE EXAMPLE 4

Without performing the step of passing nitrogen gas through the catalyst system to remove free $BF_3$, polybutene was produced according to the method of Comparative example 3. As a result, the conversion ratio of isobutene was 86%, the molecular weight (Mn) of the produced polybutene was 1250, the polydispersity(Pd) was 1.92, and the content of terminal vinylidene was 77%.

COMPARATIVE EXAMPLES 5~8

The catalyst systems were produced with boron trifluoride, isopropyl ether and t-butylalcohol of the compositions shown in Table 4 according to the method of Example 2. Except of using the produced catalyst systems and that the polymerization temperature and the contact time were controlled to −12° C. and 45 minutes, respectively, polybutene was produced in the same manner of Example 1. The properties of the produced polybutene were measured, and the results are set forth in Table 4.

TABLE 4

| No. | Boron trifluoride | diisopropylether | t-butyl alcohol | Ether/ alcohol ratio | Cocat./ $BF_3$ ratio | Conversion ratio | Terminal vinylidene Content |
|---|---|---|---|---|---|---|---|
| Comparative Example 5 | 3.63 g (54 mmol) | 4.29 g (42 mmol) | 2.08 g (28 mmol) | 1.5 | 1.3 | 87% | 77% |
| Comparative Example 6 | 3.63 g (54 mmol) | 5.62 g (55 mmol) | 1.11 g (15 mmol) | 3.67 | 1.3 | 91% | 78% |
| Comparative Example 7 | 3.63 g (54 mmol) | 1.02 g (10 mmol) | 4.45 g (60 mmol) | 0.17 | 1.3 | 85% | 75% |
| Comparative Example 8 | 3.63 g (54 mmol) | 7.25 g (71 mmol) | 0.37 (5 mmol) | 14.1 | 1.4 | 84% | 72% |

(In Table 4, "Cocat" is diisopropylether and t-butyl alcohol.)

According to Comparative example 1, in which diisopropylether as a co-catalyst and dichloromethane as a polar solvent were used, the content of terminal vinylidene was lower than that of Examples 1~9. This shows that tertiary alcohol is effective for increasing the content of terminal vinylidene. From Example 2, when diisopropylether and t-butylalcohol are used as the co-catalyst, the molecular weight and the content of terminal vinylidene increase as the reaction temperature decreases. In Comparative examples 3 and 4, the content of terminal vinylidene greatly varies according to the existence of free $BF_3$, while the influence of free $BF_3$ was insignificant in Example 2. In Example 3, the content of terminal vinylidene increases as the purity of isobutene increases. If the ratio of diisopropylether/t-butylalcohol is less or more than 0.5~1.2 (Comparative examples 5~8), the content of terminal vinylidene remarkably decreases.

As described above, the catalyst of the present invention increases the content of terminal vinylidene of polybutene. In addition, the catalyst system of the present invention is easy to commercially-obtain, and the after-treatment of removing the free $BF_3$ from the catalyst is not necessary for the catalyst of the present invention. Further, when using the catalyst system of the present invention, the properties of the produced polybutene are not influenced seriously by the contact time and/or the existence of free $BF_3$ in the catalyst system.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for producing high reactive polybutene having 300~5000 of number average molecular weight (Mn) from (a) isobutene, (b) C4 hydrocarbon compounds derived from cracking of naphtha, and containing more than 10 weight % of isobutene, or (c) C4 hydrocarbon compounds derived from a refining process of crude oil or from catalytic cracking of heavy gas oil, and containing more than 10 weight % of isobutene, wherein a polymerization reaction of the isobutene is carried out in the presence of a catalyst system comprising secondary alkylether, tertiary alcohol, and boron trifluoride, the amount of boron trifluoride is 0.05~1.0 weight part per 100 weight part of isobutene, the mole ratio of a co-catalyst including secondary alkylether and tertiary alcohol:boron trifluoride is 1.0~2.0:1, and the mole ratio of secondary alkylether:tertiary alcohol is 0.5~1.2:1.

2. The method according to claim 1, wherein the secondary alkylether is selected from the group consisting of diisopropylether, di(sec-butyl)ether, di(sec-hexyl)ether, di(sec-octyl) ether and mixtures thereof.

3. The method according to claim 1, wherein the tertiary alcohol is selected from the group consisting of t-butylalcohol, 4-hydroxy-4-methyl-2-pentanone, 2-methyl-2-butanol and mixtures thereof.

4. The method according to claim 1, wherein the polymerization reaction is carried out at the temperature of −50~20° C.

5. The method according to claim 1, wherein the catalyst system further includes one or more solvent selected from the group consisting of chloromethane, dichloromethane, and chloroform.

6. A method of producing high reactive polybutene, comprising the steps of:

preparing a catalyst system including secondary alkylether, tertiary alcohol, and boron trifluoride;

introducing the catalyst system to a polymerizing reaction of (a) isobutene, (b) C4 hydrocarbon compounds derived from cracking of naphtha and containing more than 10 weight % of isobutene, or (c) C4 hydrocarbon compounds derived from a refining process of crude oil or from catalytic cracking of heavy gas oil and containing more than 10 weight % of isobutene, to form a polymerization product; and stripping the polymerization product to generate high reactive polybutene having a 300~5000 number average molecular weight, wherein the amount of boron trifluoride is 0.05~1.0 weight part per 100 weight part of isobutene, the mole ratio of a co-catalyst including secondary alkylether and tertiary alcohol:boron trifluoride is 1.0~2.0:1, and the mole ratio of secondary alkylether:tertiary alcohol is 0.5~1.2:1.

\* \* \* \* \*